(12) United States Patent
Messing et al.

(10) Patent No.: US 8,769,708 B2
(45) Date of Patent: Jul. 1, 2014

(54) PRIVILEGED DOCUMENT IDENTIFICATION AND CLASSIFICATION SYSTEM

(75) Inventors: Yerachmiel Tzvi Messing, Baltimore, MD (US); David Matthew Shub, Cranford, NJ (US); James Kenneth Wagner, Jr., Marietta, GA (US)

(73) Assignee: DiscoverReady LLC, Charlotte, NC (US)

( * ) Notice: Subject to any disclaimer, the term of this patent is extended or adjusted under 35 U.S.C. 154(b) by 66 days.

(21) Appl. No.: 13/359,401

(22) Filed: Jan. 26, 2012

(65) Prior Publication Data

US 2012/0192286 A1   Jul. 26, 2012

Related U.S. Application Data

(60) Provisional application No. 61/436,556, filed on Jan. 26, 2011.

(51) Int. Cl.
*G06F 17/30* (2006.01)
(52) U.S. Cl.
CPC .... *G06F 17/30011* (2013.01); *G06F 17/30707* (2013.01)
USPC .......................................................... 726/30
(58) Field of Classification Search
CPC ..... G06F 21/10; G06F 21/6218; G06F 15/18; G06F 17/30; G06F 17/00; G11B 20/00086; H04L 2463/101; H04L 63/0428
USPC .......................................................... 726/27
See application file for complete search history.

(56) References Cited

U.S. PATENT DOCUMENTS

| | | | | |
|---|---|---|---|---|
| 6,738,760 | B1 * | 5/2004 | Krachman | 1/1 |
| 7,130,858 | B2 * | 10/2006 | Ciaramitaro et al. | 1/1 |
| 7,698,298 | B2 * | 4/2010 | Ciaramitaro et al. | 707/999.107 |
| 7,730,113 | B1 * | 6/2010 | Payette et al. | 707/821 |
| 8,396,871 | B2 * | 3/2013 | Barsony et al. | 707/737 |
| 2001/0034845 | A1 * | 10/2001 | Brunt et al. | 713/201 |
| 2004/0199555 | A1 * | 10/2004 | Krachman | 707/204 |
| 2004/0260876 | A1 * | 12/2004 | Singh et al. | 711/117 |
| 2005/0004951 | A1 * | 1/2005 | Ciaramitaro et al. | 707/104.1 |
| 2005/0010601 | A1 * | 1/2005 | Ciaramitaro et al. | 707/104.1 |
| 2005/0086226 | A1 * | 4/2005 | Krachman | 707/6 |
| 2009/0193210 | A1 * | 7/2009 | Hewett et al. | 711/163 |
| 2009/0265609 | A1 * | 10/2009 | Rangan et al. | 715/234 |
| 2009/0300770 | A1 * | 12/2009 | Rowney et al. | 726/26 |
| 2010/0253967 | A1 * | 10/2010 | Privault et al. | 358/1.15 |
| 2010/0312725 | A1 * | 12/2010 | Privault et al. | 706/12 |
| 2011/0029525 | A1 * | 2/2011 | Knight | 707/737 |
| 2011/0029536 | A1 * | 2/2011 | Knight et al. | 707/740 |
| 2011/0320480 | A1 * | 12/2011 | Kisin et al. | 707/769 |
| 2012/0054135 | A1 * | 3/2012 | Salaka et al. | 706/13 |
| 2013/0077857 | A1 * | 3/2013 | Privault et al. | 382/159 |

* cited by examiner

*Primary Examiner* — Eleni Shiferaw
*Assistant Examiner* — Nelson Giddins
(74) *Attorney, Agent, or Firm* — Mintz Levin Cohn Ferris Glovsky and Popeo, P.C.

(57) ABSTRACT

A litigation discovery document system is provided to help identify documents that might be privileged. In particular, a system is described in which documents within a document set are compared against one or more data sources which store data that indicate whether a particular document is privileged or potentially privileged. Human reviewers can confirm whether such determinations are accurate. Analytic reports can be provided which characterize the underlying methodology used to make such determinations. Related apparatus, systems, techniques and articles are also described.

22 Claims, 10 Drawing Sheets

PRIVILEGED DOCUMENT IDENTIFICATION AND CLASSIFICATION SYSTEM

RELATED APPLICATION

This application claims priority to U.S. Pat. App. Ser. No. 61/436,556 filed on Jan. 26, 2011, the contents of which are hereby fully incorporated by reference.

TECHNICAL FIELD

The subject matter described herein relates to techniques for identifying and classifying potentially privileged and privileged documents.

BACKGROUND

Technology has exponentially facilitated the capacity to generate, share and store information, acting as the backbone of our knowledge-based economy. But that same technological capacity that supports our economy is negatively impacting our justice system. It has created enormous problems for trial lawyers and their clients, who are regularly challenged to sift through terabytes of information to find relevant, privileged or confidential material in a way that is accurate, consistent and yet cost-effective.

When one case can require sorting through a terabyte of data, the result can be 75 million pages for review, taking up to 375,000 hours of time. Studies have estimated that document review accounts for 50 to 90 percent of the cost involved in litigation matters, and one report has suggested that 70 percent or more of the cost of discovery is now attributable solely to human review of documents for responsiveness and privilege.

The problem with purely human review of documents is not just a problem of time and money. It is one of consistency and accuracy as well. Dozens of reviewers working on thousands of documents a day are bound to sort and code documents differently based on their subjective judgments, experience levels, fatigue and other factors. Even with sound quality control checks, the risks of making a mistake are substantial, and the results can be devastating: discovery sanctions, loss of trade secrets, loss of attorney-client privilege, or a bad outcome at trial. The mounting costs and exposures associated with human document review can affect even the calculus of whether to sue, defend or settle for any given claim.

SUMMARY

The current subject matter can be used to identify privileged documents (or other categories of documents) by comparing a set of documents against one or more datastores. One datastore can be accessible by a service and contain an exhaustive list of e-mail address, domains, and other identifying information (such as law firm names, etc.) which suggest that a particular document might be privileged. This datastore can be generated across multiple litigations/clients. The datastore can also include user-defined e-mail address, terms, and the like which can also be used to identify potentially privileged documents. Similarly, users can conduct custom queries against the set of documents to identify privileged documents. Once documents are identified as potentially privileged, they can be flagged or otherwise set for human review and in some instances, documents that are not identified as potentially privileged can avoid human review altogether. For example, in some implementations, the documents themselves (or scans of same) that are flagged for human review can be sent to a human reviewer, who in turn, can confirm whether or not such documents are privileged. Alternatively, IDs for such documents can be provided so that a human reviewer can retrieve and review the corresponding physical/tangible documents. The privileged documents/potentially privileged documents can be segregated to help ensure that they are not inadvertently disclosed. In addition, analytic reports can be provided to support the underlying methodology in case it is challenged in court.

In one particular aspect, a set of documents are received. Attributes of these documents are compared with a plurality of pre-defined indicators characterizing a likelihood of the document containing such attribute being privileged. Thereafter, it is determined which of the documents are potentially privileged based on the comparison. Data can then be provided (e.g., displayed, stored, transmitted, etc.) identifying which of the documents are potentially privileged.

The attributes can comprise content of the documents and/or contextual information associated with the document. Example attributes include, but are not limited to: terms within a document, metadata, document ID, sending entity, receiving entity, copied entity, blind copied entity, subject line, date and/or time sent, date and/or time received, file name, file size, file checksum, reviewed, hash, attachment, confidentiality, author, title, file type, document extension, pre-defined category, privilege, and pre-defined issues.

Each of the documents determined to be potentially privileged can be tagged with a privileged identifier. In some cases, such documents can be segregated from other documents and stored separately from documents not identified as potentially privileged (for example, in a privilege database, etc.). These documents can then later be provided to a user for human review using, for example, a computer-implemented workflow (in, for example, a graphical user interface, etc.) or by simply identifying such documents to enable a user to manually review.

The comparison of attributes of the documents with the privilege indicators can involve accessing one or more databases containing such attributes. The privilege indicators can include user-specific terms/text strings and/or it can use terms/text strings developed over the course of several litigations (whether unique to a particular user/client or across many users/clients). The privilege indicators can include e-mail addresses and/or e-mail address domain names (which in turn can be stored in a domains database). The user-specified terms can be names/terms/text strings unique to a particular litigation matter and/or previously used by a particular user.

In some implementations, some or all of the documents can be grouped based on common characteristics among the documents. With such grouping, one or more representative documents can be used in order to make a determination whether the entire group is potentially privileged. Duplicate documents or substantially duplicate/overlapping documents can be grouped together in order to receive the same treatment. Historical decisions (whether implemented by a computer-initiated decision or by human review) can also be utilized in order to determine whether similar documents are potentially privileged.

In addition, certain filtering can be applied to the documents so that certain portions such as headers, footers, disclaimers, etc. are not considered as part of the comparison analysis. Furthermore, non-privilege indicators can also be utilized, which when present in a particular document, suggest that the document is not privileged (for example language relating to website pages, press releases, privacy terms, product brochures, etc.).

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. The methods described herein can be implemented by one or more data processors executing within one or more computer systems.

The current subject matter provides many advantages. For example, the current subject matter allows a comparison of documents against privilege indicators developed across multiple litigation matters (and in some case across multiple clients) while being combined with user-specific privilege indicators. Such an arrangement provides a strong likelihood of identifying privileged documents while requiring a fraction of the time of manual human review.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter describes methods, systems, apparatuses, and articles (sometimes referred to herein as "PrivBank" or the "PrivBank system"—PrivBank being a registered trademark of DiscoverReady LLC) for collecting information and insight gained from reviewing more than 10 million electronic files (100 million pages) for privileged material over hundreds of cases and from thousands of hours of independent research. The current subject matter can be implemented in connection with a wide variety of platforms including, without limitation, the platform (and related systems, methods, and articles) described in co-pending application Ser. No. 13/014,643, the contents of which are hereby fully incorporated by reference, as well as the i-Decision® platform by DiscoverReady, LLC.

Figure 1:
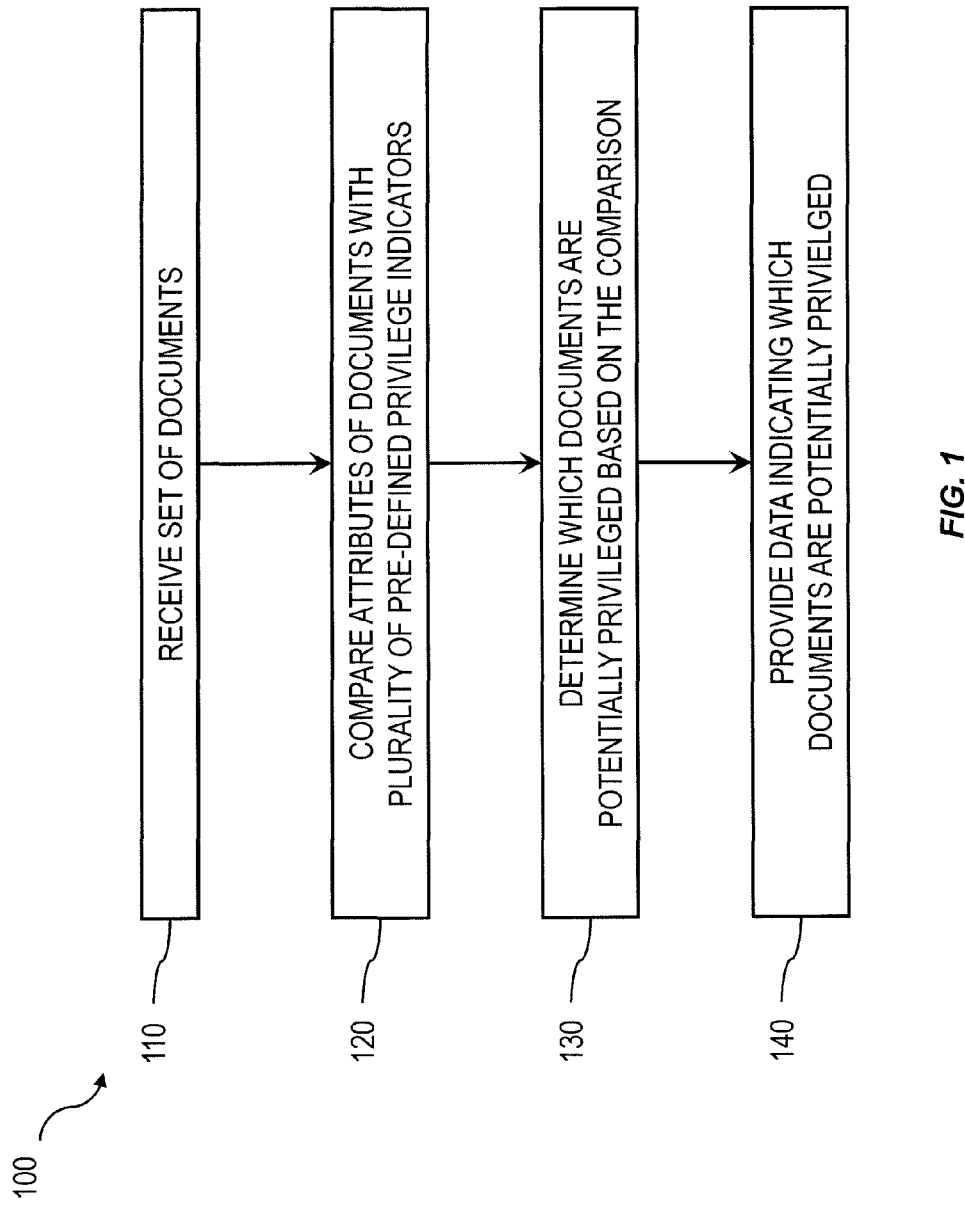
FIG. 1 is a process flow diagram illustrating a method for characterizing whether documents are potentially privileged.

With reference to FIG. 1, a method 100 is illustrated in which, at 110, a set of documents is imported/received. Thereafter, at 120, attributes of each of the documents are compared with a plurality of predefined indicators that characterize a likelihood of the document containing such attributes being privileged. Based on this comparison, at 130, it is determined which of the documents are potentially privileged based on the comparison. Data can then be provided, at 140, that identifies which of the documents are potentially privileged.

The attributes can comprise content of the documents and/or contextual information associated with the document. Example attributes include, but are not limited to: terms within a document, metadata, document ID, sending entity, receiving entity, copied entity, blind copied entity, subject line, date and/or time sent, date and/or time received, file name, file size, file checksum, reviewed, hash, attachment, confidentiality, author, title, file type, document extension, pre-defined category, privilege, and pre-defined issues.

Figure 2:
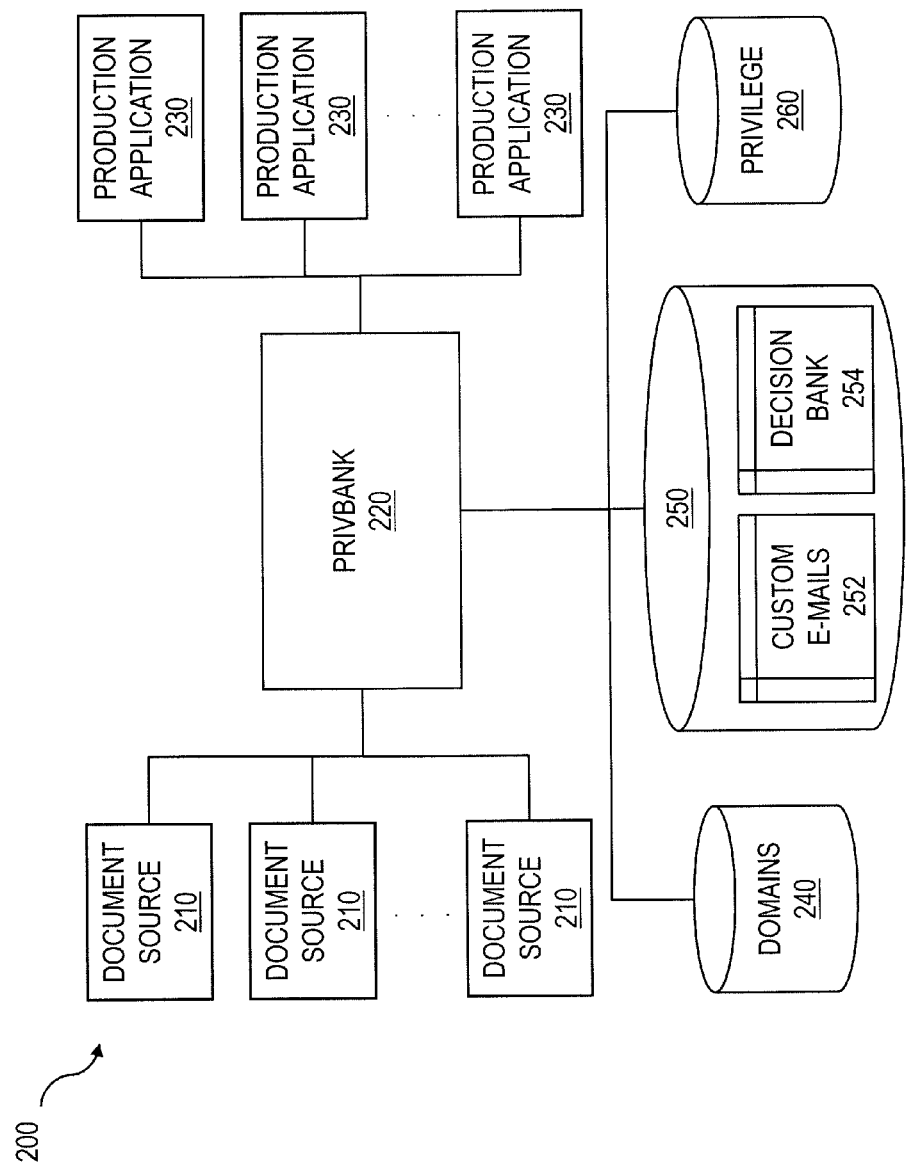
FIG. 2 is a system diagram illustrating a system for identifying whether documents are potentially privileged.

FIG. 2 is a system diagram illustrating a system 200 in which one or more documents sources 210 provide data characterizing documents (or the documents themselves) to a PrivBank system 220. As will be discussed in more detail below, the PrivBank system 220 can compare terms within imported documents in relation to domains obtained from a domains database 240 and/or other contextual information obtained from a secondary data source 250. The secondary data source 250 can include, for example, a custom e-mails datastore 252 and/or a decision bank 254 datastore. Documents determined not to be privileged and/or data identifying such documents can be transferred to one or more document production applications 230. Documents determined to be potentially privileged can be segregated and, in some cases, stored in a separate privilege database 260.

The custom e-mails datastore 252 can represent data that a customer/user of the PrivBank system 220 can add in for any e-mail addresses that are unique to its business or case that should also be considered an indicator of potentially privileged communications. The decision bank datastore 254 can represent data that is collected over each use of the PrivBank system 220 to retain unique identifying information (such as a hashcode or other document characteristics that associate documents with each other) on documents that have been previously analyzed and the resulting decisions (e.g., privileged/non-privileged, etc.) so that document matches can be identified and past decisions reused without the time and load of performing full text searches repeatedly or requiring any additional processing or human review. The PrivBank system 220 can retain other identifying information (such as author, sender, recipient, full text) so past decisions can be used with respect to substantially similar documents that are later encountered.

The custom e-mails datastore 252 can be populated in a variety of manners. E-mail addresses can be manually input, imported from an e-mail client, or otherwise mapped from a first format to another format.

The domains database 240 can contain names, e-mail addresses and domain names associated with attorneys, law firms and consultants from around the world. This can be combined with complex queries for identifying privileged communications and work product which have been optimized by thousands of hours formulating and refining. The current subject matter is advantageous in that it can identify a high percentage of privileged records using the domains database 240 and stored queries.

At the outset of each litigation matter, the PrivBank system 220 can help identify and segregate documents imported from the document sources 210 containing key indicators of privilege. With this segregated data, a segregated data storage area can be created for each client in the privilege database 260 and corresponding data can be deposited therein. A resulting "fingerprint" for each file within a client-specific area within the privilege database 260 and corresponding content can be reused from one matter to the next, allowing for an increasingly effective privilege screening process.

The system 200 of FIG. 2 (and environment) can be implemented in a client application (e.g., a Windows application, etc.) and/or a web-based/networked application. With a client application, the system 200 can be distributed/sold/licensed for customer usage to retrieve documents from a document repository and/or one or more remote document sources 210, compare attributes of the documents against various items such as, for example, pre-defined search terms (in the secondary data source 250) and bank of domains (in the domains database 240) to look for a set of documents, and export a potential privilege mark for all the documents with hits into the document production applications 230. With either a client application or a web-based application, all data can be secured using any variety of technologies/protocols. For example, encrypted XML files can be used for client based implementations and secure transmission technologies such as SSL protocols can be used for web-based implementations.

The domains database 240 can be used by the PrivBank system 220 to scan whether corresponding indicators (e.g., domain names, domains, etc.) are referenced within a set of documents, and if they are, the documents can be considered as potentially privileged due to attorney-client communications. In addition, scripts and processes can be used automatically or manually by highly technical people to generate query strings to search for custom names, terms, and e-mail addresses in a similar manner. These functions and processes can be used against a set of documents to identify which documents are "hits" and should be considered as potentially privileged.

The domains database 240 can be made available to a plurality of separate entities/clients and can include information derived from, for example, historical litigation matters. While the domains database 240 and the secondary data source 250 are illustrated as being separate, it will be appreciated that the data contained therein can be integrated into a single database. In some cases, the single database can provide partitioning for multiple tenants such that tenant specific information is segregated from other tenants and the domains database is accessible by multiple tenants. In addition, while FIG. 2 illustrates the integration of the PrivBank system 220 with a plurality of applications 210, 230, it will be appreciated that the PrivBank system 220 can incorporate the functionality of one or more of such applications 210, 230, whether or not such applications are identified in FIG. 1. For example, the PrivBank system 220 can be integrated into a document classification application that classifies documents according to categories such as privileged/non-privileged, a document management system, e-mail servers, and the like.

In some cases in which the PrivBank system 220 is offered as a service, the domains datastore 240 can be offered/consumed as a secured database to customers. Stated differently, the domains datastore 240 can be configured so that it is accessible as a service and does not expose any of the underlying data such as the aggregated domains list, but rather, information can be returned which indicates whether a hit is present.

The PrivBank system 220 can render a graphical user interface which allows a user to set up/configure the system. The interface can allow a user to enter search terms which in turn can produce SQL or Boolean keyword queries and alias combinations for case searches. The interface can allow for the ability to modify the application of the custom e-mails datastore 252 by adding/update/delete search terms within case searches (created above). The interface can provide the ability to run some or all defined searches against a document set and produce a report of all the document IDs with a hit and what search(es) it hit.

The PrivBank system 220 can be used to generate or it can contain search query logic to perform, for example, one or more of the following (which in turn is used to determine whether a particular document is potentially privileged):

- "Domains List" (SQL)—searching for e-mail domains that are on a pre-defined list of domains of law-firm or litigation-support entities (the "Domains List").
- "Generic subset in e-mail Address Header Fields" (SQL)—look for selected privilege-rich terms in the Header of an e-mail (such as "law" or "legal"). Running this query can be helpful to identify documents that are highly likely to be privileged.
- "Generic subset in Subject" (SQL)—look for selected privilege-rich terms in the Subject line of an e-mail (such as "law" and "legal"). Running this query can be helpful to identify documents that are highly likely to be privileged.
- "Domains List" (Full Text)—This includes the use of the Domain List as a full-text Boolean search. The domain search can be run for each domain that is found to exist in a prior matter for the client or in the Domains List-SQL search (above) that is run earlier. The goal is to find references to a legal entity domain in the header, subject line, or body of e-mail and in the searchable text of other documents.
- "Client Internal E-mail" (SQL)—Using client-provided e-mail addresses for the client's internal legal personnel, search in the data for other potential e-mail addresses for identified legal personnel, and build searches for likely e-mail addresses if no particular e-mail address is provided or can be found for a given legal department person. To identify communications with internal legal personnel, which are highly likely to be privileged, a query can be run on the back end that searches the e-mail Address Header Fields for those given, found, and built e-mail addresses.
- "Client Internal E-mail" (Full Text)—Text search for e-mail addresses of client-specific internal legal personnel found anywhere within a document (such as "John.Smith@client.com").
- "Client Internal Names" (Full Text)—Text search for the names of client-specific internal legal personnel found anywhere within a document (such as "Smith, John" or any internal counsel nickname). Because legal personnel names may occur within the text of a document, and because either in the history of an e-mail chain a "display name" may be shown rather than an e-mail address, it is important to search for the names, as well as any nicknames, of legal personnel. Name searches can be built to consistently account for common nicknames for given names.
- "Client-Specified Outside Counsel Names" (Full Text)—Text search for specific outside counsel attorneys who worked on the underlying matter found anywhere within a document. Because legal personnel names may occur within the text of a document, and because either in the history of an e-mail chain a "display name" may be shown rather than an e-mail address, it is important to search for the names, as well as any nicknames, of legal personnel. Name searches can be built to consistently account for common nicknames for given names.

"Client Internal Counsel Department Names" (Full Text)—Text search for specific client departments (such as "Legal Dept." or "Compliance Dept.") found anywhere within a document.

"Names List" (Full Text)—Proper names of law firms and legal support companies that correspond to domains from the document universe matching the Domains List-SQL (search (2), above). A proper name search can be run for each domain that is found to exist in a prior or current client matter.

"Generic Terms" (Full Text)—This text search contains standard terms to capture indicia of privilege that are not captured by law firm names. This search can vary slightly depending on the type of matter, and whether the client is concerned about client confidentiality as well as privilege. It can also be customized to avoid common footers or disclaimers which may contain text that otherwise would be suggestive of privilege.

"Privacy Terms" (Full Text)—Text search for potentially personally sensitive or embarrassing terms such as curse words, illicit drugs, medical conditions, allusions to sexual activity and family-related matters.

"Third Party Confidentiality Terms" (Full Text)—Generic terms designed to identify documents that may need to be withheld until third party clearance is obtained. For example, documents subject to third party non-disclosure agreements would fall under this search. This search could be generic (such as "NDA" or "Confidentiality Agreement") or specific to search for parties that are known to have non-disclosure agreements in place.

"Previously Privileged" (SQL)—Using hash values or other methodologies to identify exact duplicates or substantial similar instances, documents are reviewed against privileged documents for the client from earlier review ("previously privileged does").

The PrivBank system 220 can report the results in a variety of manners. For example analytics reports can identify hit rates for a particular case. Such hit rates can be broken down by document source, document type, and/or other factors.

Past document decisions can be imported into the decision bank datastore 254 from a variety of sources such as a generic/proprietary data file. A query builder can allow a user to get all document IDs (or other designated fields) that meet user defined criteria (such as all those that were found privileged from specific case databases). The decision bank datastore 254 can be accessed while processing documents to determine if the document has already had a past decision made. Options can be provided for a user to define how documents are matched up (such as to use the file name, created date and file size or substantial textual similarity instead of the hash code). Decision bank datastore 254 can also allow for the storage of decisions made on a document after performing queries.

In addition, analytics can be utilized to compare results of custom queries against past decisions and provide suggestions for changes to the queries (i.e., queries can be optimized based on past decision knowledge, etc.).

In arrangements in which third party applications are integrated or utilized by the PrivBank system 220, generic integrations can be provided that allow for custom delimited files to import/export data with such third party applications. Custom delimited in this regard means that a user can define what character is used for field delimiters and what character is used for record delimiters (for example, a TSV file uses <TAB> for the field delimiter and CR/LF for the record delimiter). An interchangeable model can be provided such that external interfaces can be built for each third party application to interact directly with the database tables producing the exact same results as the generic integration achieved. This data can consist of a minimum of Document ID, e-mail to, e-mail from, and subject. Additional fields such as e-mail CC and e-mail BCC can be optionally available for field mapping.

Figure 3:
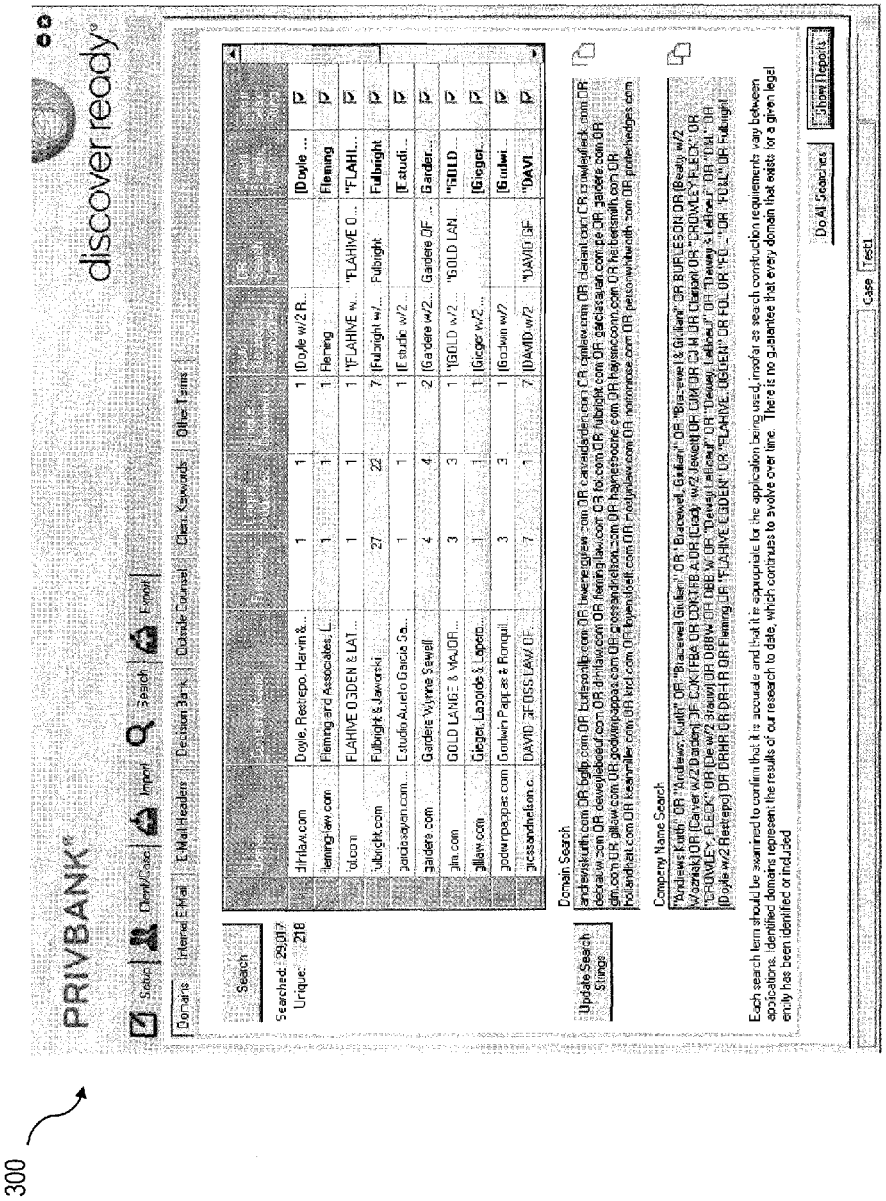
FIG. 3 is a screenshot illustrating domain comparison search results and generated keyword search strings.
Figure 4:
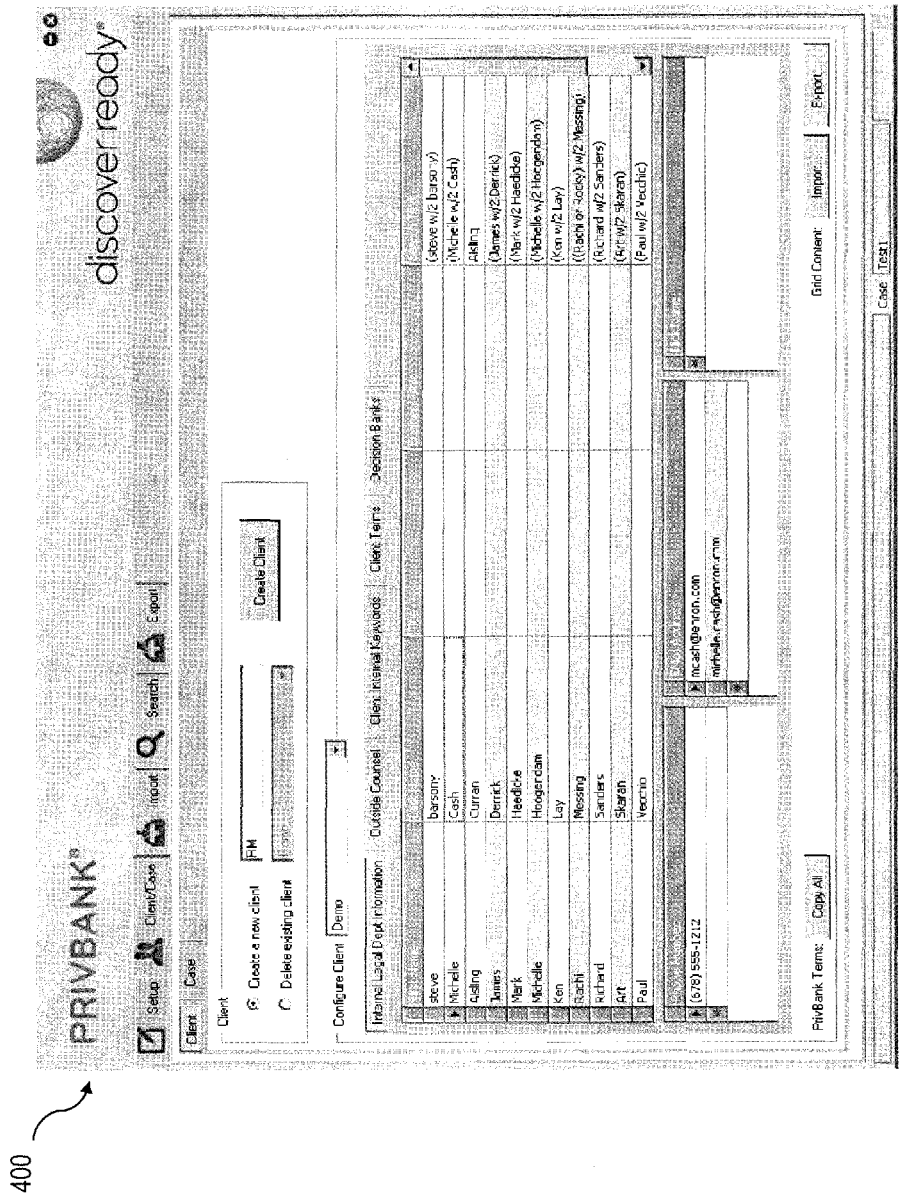
FIG. 4 is a screenshot illustrating an interface for client and case setup.
Figure 5:
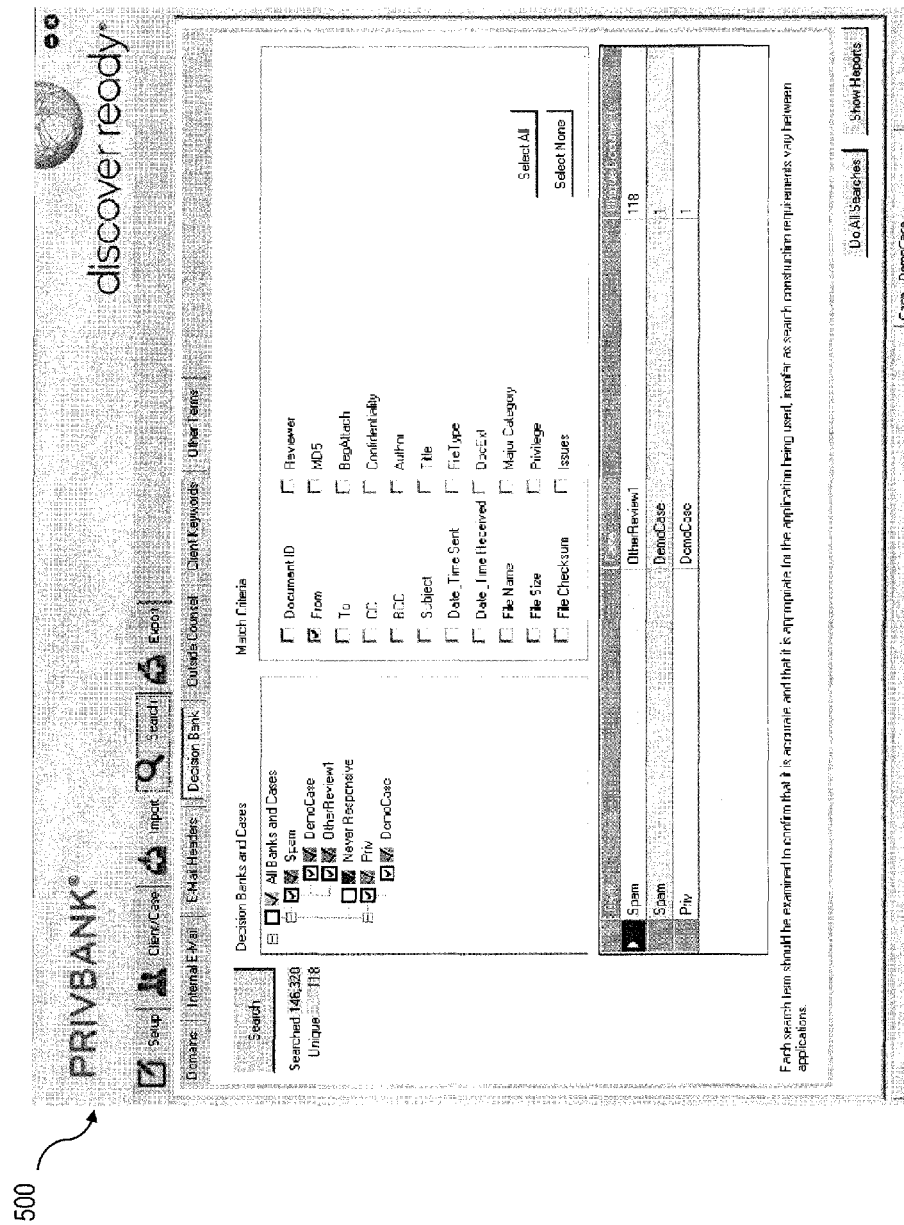
FIG. 5 is a screenshot illustrating an interface for banking documents.
Figure 6:
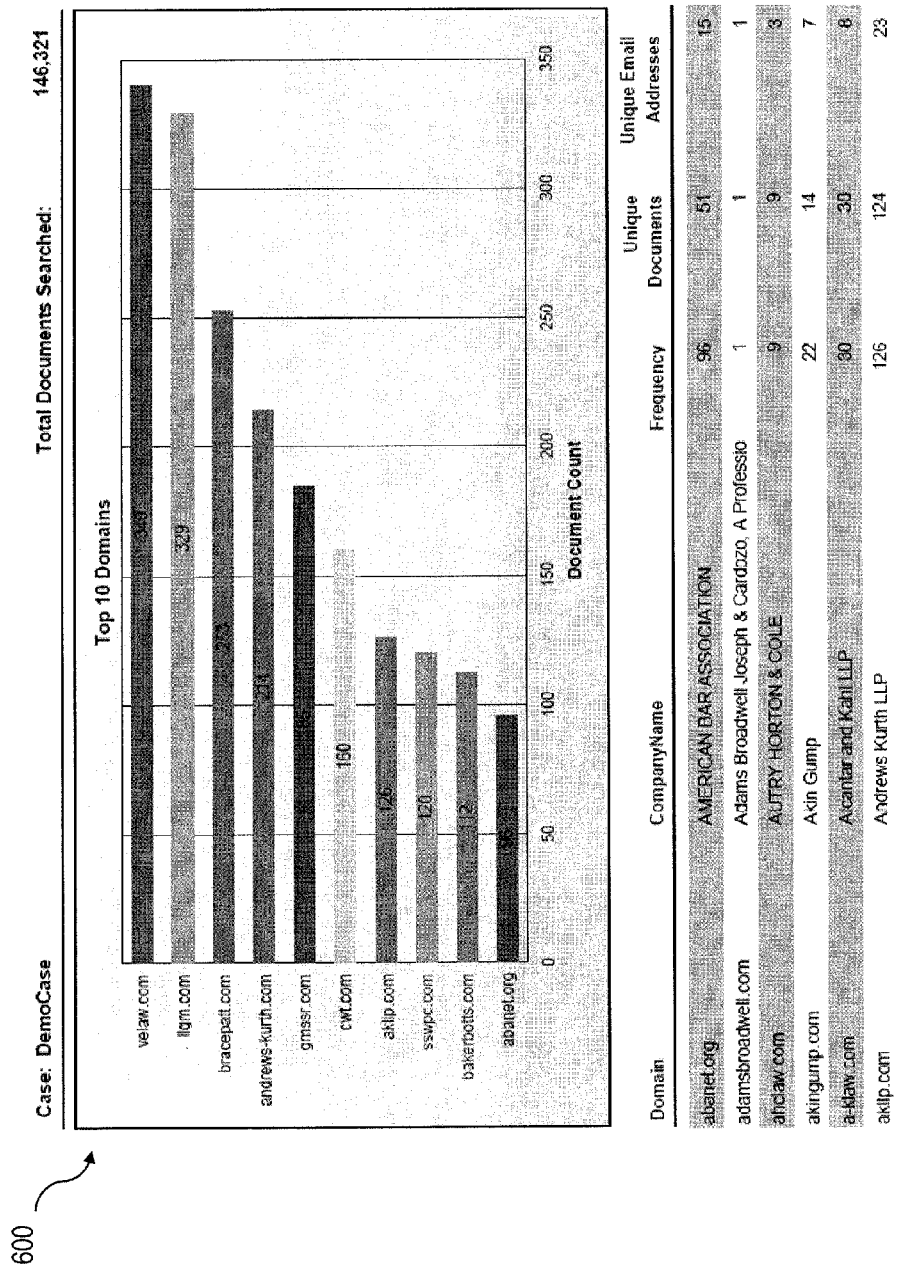
FIG. 6 is a report snapshot illustrating top domains found within analyzed documents.
Figure 7:
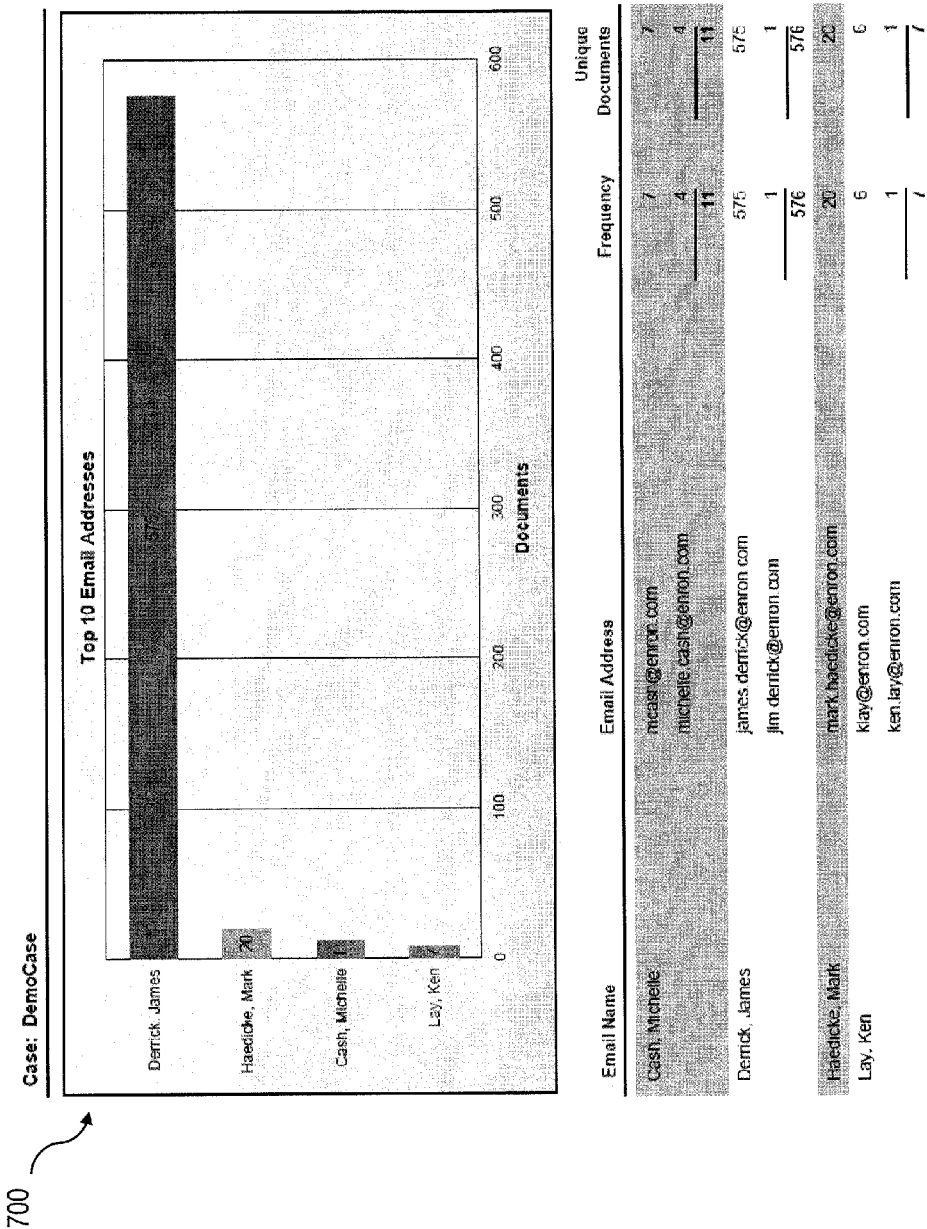
FIG. 7 is a report snapshot illustrating top e-mail addressed found within analyzed documents.
Figure 8:
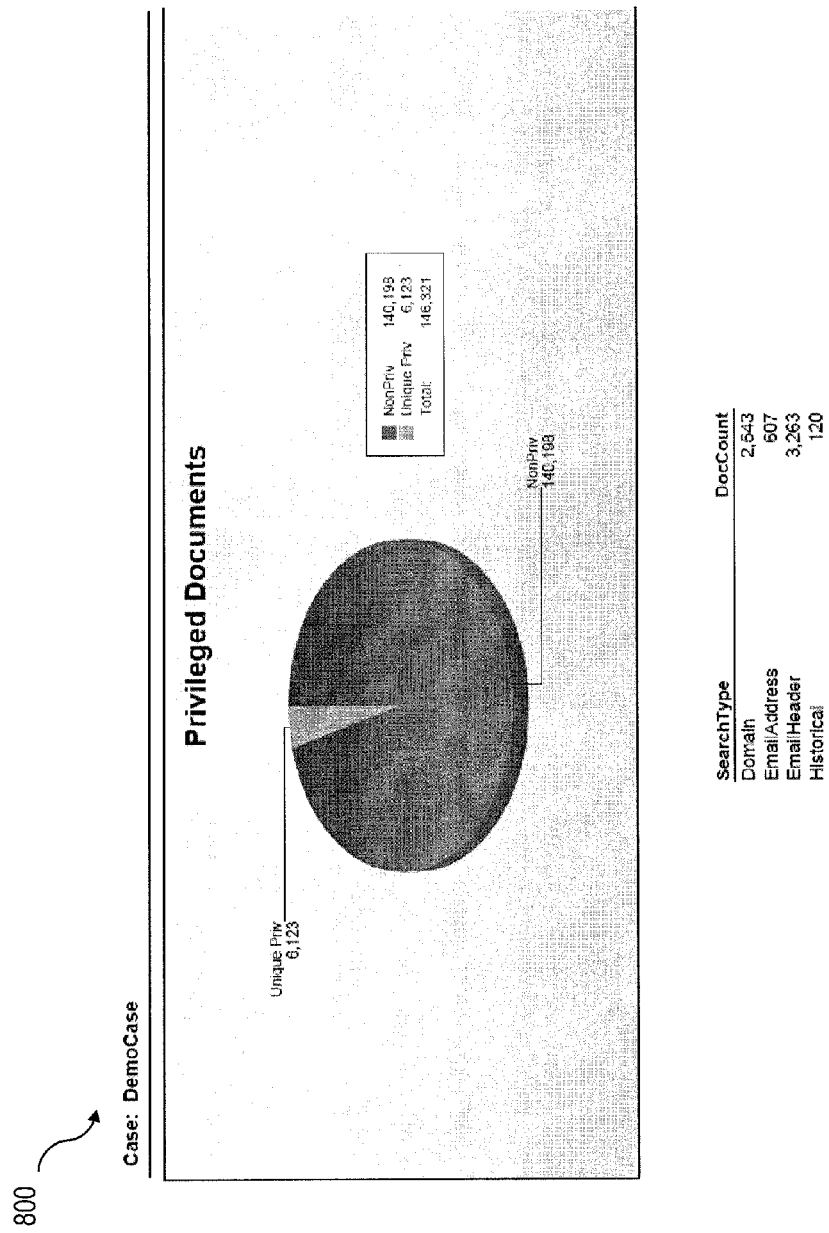
FIG. 8 is a report snapshot illustrating relative numbers of privileged and non-privileged documents within a corpus of analyzed documents.

The PrivBank system 220 interface can include a variety of screens (see, for example, FIGS. 3-8) to aid the determination of whether certain documents are potentially privileged and resulting analytics. FIG. 3 is a screenshot 300 illustrating domain comparison search results and generated keyword search strings. FIG. 4 is a screenshot 400 illustrating an interface for client and case setup that can be used to input and track information customized for a specific client or matter. FIG. 5 is a diagram 500 illustrating an interface for banking documents for which a decision (e.g., privileged/non-privileged, etc.) have already been made (i.e., historical decisions). This interface can be used to compare attributes of new documents with previous determinations in prior matters. FIG. 6 is a report snapshot 600 that illustrates the top ten domains which were found in a corpus of analyzed documents. Such information can be useful in high granularity characterizations of a certain corpus of documents. Similarly, FIG. 7 is a report snapshot 700 that illustrates the top e-mail addresses that were identified within a corpus of analyzed documents. FIG. 8 is a report snapshot 800 that shows relative numbers of privileged and non-privileged documents within a corpus of analyzed documents.

Further, a main screen can include the navigation to all functionality including setup, updates, to import documents, to define search terms, launch a privilege search process, and export results (e.g., document tags, etc.). A setup screen can be used to define any parameters necessary for the operation of the PrivBank system 220, define parameters about how it will run, and perform maintenance such as creating backups of the database and restoring from previous backups. An update screen can allow users to check whether there are any published updates (software or data) to the PrivBank system 220 or domain databases 240 and will download/install as necessary.

In addition, an Import Document screen can prompt the user for the source application to be used for the import, and any necessary information such as file location, database name, field delimiters (such as <TAB>), record delimiters (such as CR/LF), etc. as required for that integration. A define search term screen can define search terms that allow for the user to enter names/terms they wish to consider privilege and to generate the appropriate aliases and query string appropriate to accommodate the search term entered. These terms can be saved off to the custom database specific to that user's installation. A privilege search screen can be displayed while searching for privileged documents and is primarily a status screen that will show the user the progress (% complete, # of hits found, etc.) of the search in real time as it is occurring. Upon completion, a report will be available to the user listing all the Doc ID's that were hits and the search terms they hit on. An export privilege tags screen can be provided that is similar to the import document screen. The export tags screen can prompt the user for the destination application to be exported into, and any necessary information such as file location, database name, field delimiters (such as <TAB>), record delimiters (such as CR/LF), etc. as required for that integration. Upon completion, a summary screen can be displayed showing the number of privilege tags that were updated.

Figure 9A:
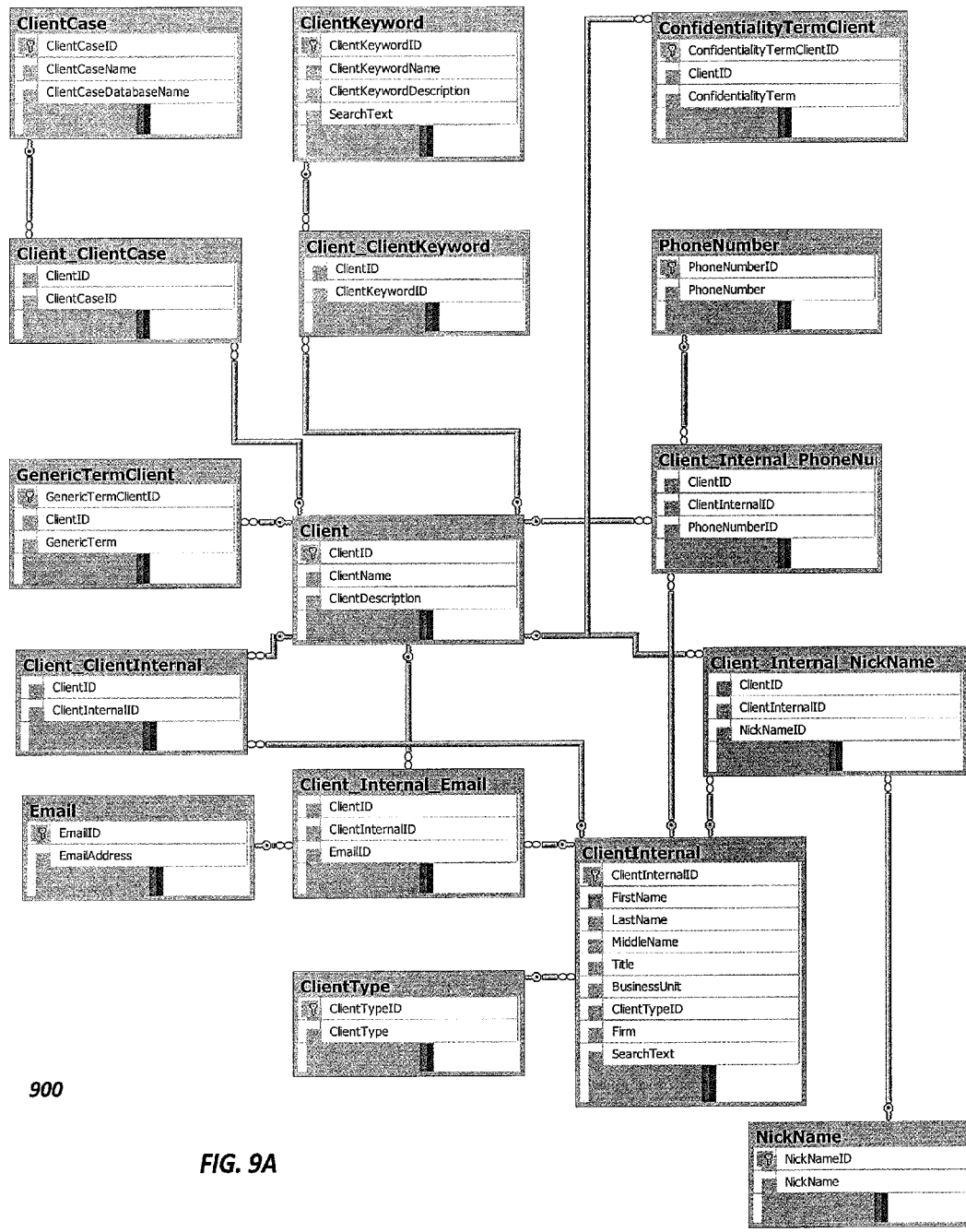
FIGS. 9A and 9B are sample SQL table diagrams for use with the current subject matter.
Figure 9B:
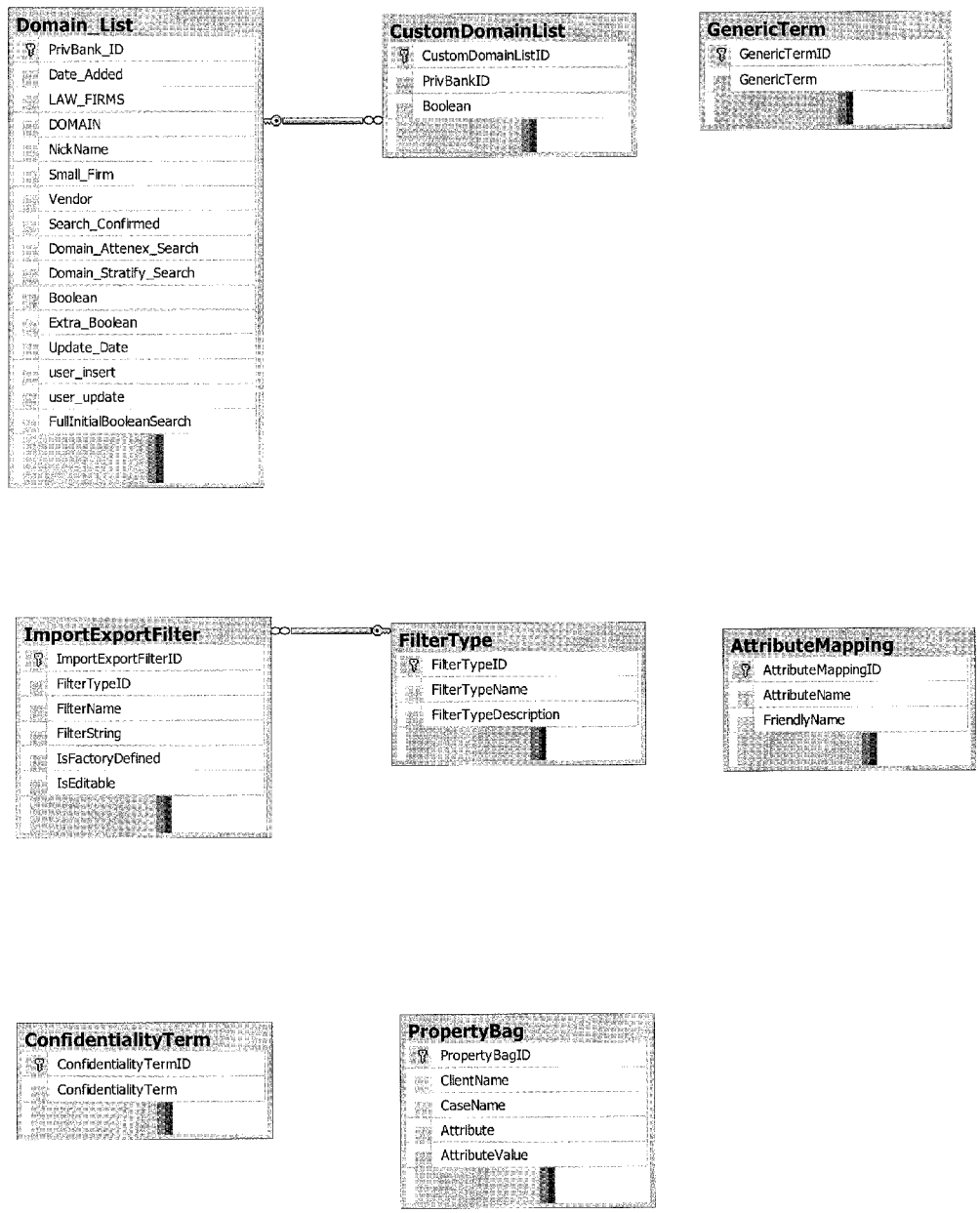

FIGS. 9A and 9B are sample SQL table diagrams 900 that may be used to implement the current subject matter. It will be appreciated that this particular table arrangement is illustrative and can be adapted or modified depending on the desired configuration.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for implementation by one or more data processors of at least one computing system comprising:
   importing, by at least one data processor, a set of documents;
   grouping, by at least one data processor, at least a portion of the set of documents based on common characteristics among the documents;
   first comparing, by at least one data processor, attributes of a subset of each grouping of the documents with a plurality of pre-defined indicators, the indicators characterizing a likelihood of the document containing such attributes being privileged and not subject to disclosure as part of an ongoing litigation matter;
   second comparing, by at least one data processor, attributes of a subset of each grouping of documents with a plurality of indicators characterizing a likelihood of the document containing such attribute not being privileged, wherein the plurality of indicators characterizing a likelihood of the document containing such attribute not being privileged is selected from a group consisting of: language from a website page, language from a press release, and language from a product brochure; and
   determining, by at least one data processor, which of the documents are potentially privileged based on the first comparison and the second comparison, the determination being applied to the entire grouping; and
   providing, by at least one data processor, data identifying which of the documents are potentially privileged.

2. A method as in claim 1, wherein the attributes are selected from a group consisting of: terms within a document, metadata for a document, document identification, sending entity, receiving entity, copied entity, blind copied entity, subject line, date and/or time sent, date and/or time received, file name, file size, file checksum, reviewed, hash, attachment, confidentiality, author, title, file type, document extension, pre-defined category, privilege, and pre-defined issues.

3. A method as in claim 1, wherein each of the documents determined to be potentially privileged are tagged with a privileged identifier.

4. A method as in claim 3, further comprising:
   segregating the documents identified as potentially privileged; and
   storing the segregated documents separately from documents not identified as potentially privileged.

5. A method as in claim 1, wherein the comparing comprises:
   accessing at least one database comprising the plurality of pre-defined indicators.

6. A method as in claim 1, further comprising:
   initiating, via a computer-implemented workflow, human review of at least a portion of the documents identified as potentially privileged, the human review providing a final determination of whether each corresponding document is privileged.

7. A method as in claim 6, wherein the human review comprises: receiving user-generated input, via a graphical user interface, indicating whether particular documents are privileged.

8. A method as in claim 1, wherein the privileged indicators comprise pre-defined e-mail addresses and/or domain names.

9. A method as in claim 1, wherein the privileged indicators comprise used-defined attributes.

10. A method as in claim 1, wherein the privileged indicators comprise terms and/or documents previously determined as being indicative of privilege.

11. A method as in claim 1, wherein duplicate or substantially duplicate documents are grouped together, wherein documents are substantially duplicate when matching content within the documents is above a pre-determined threshold.

12. A method as in claim 1, wherein the comparing excludes headers and/or footers of the documents.

13. A method as in claim 1, wherein the plurality of indicators characterizing a likelihood of the document containing such attribute not being privileged comprise privacy terms.

14. A method as in claim 1, wherein the determination of which of the documents are potentially privileged are further based on historical decisions regarding privilege made for identical or similar documents.

15. A method as in claim 1, wherein providing data comprises displaying data indicating at least a subset of the documents which were determined to be potentially privileged.

16. A method as in claim 1, wherein providing data comprises transmitting data indicating at least a subset of the documents which were determined to be potentially privileged.

17. A method as in claim 1, wherein providing data comprises storing data indicating at least a subset of the documents which were determined to be potentially privileged.

18. A non-transitory computer program product comprising instructions, which when executed by one or more data processors, result in operations comprising:
   importing, by at least one data processor, a set of documents;
   grouping, by at least one data processor, at least a portion of the set of documents based on common characteristics among the documents;
   first comparing, by at least one data processor, attributes of a subset of each grouping of the documents with a plurality of pre-defined indicators, the indicators characterizing a likelihood of the document containing such attributes being privileged and not subject to disclosure as part of an ongoing litigation matter;
   second comparing, by at least one data processor, attributes of a subset of each grouping of documents with a plurality of indicators characterizing a likelihood of the document containing such attribute not being privileged, wherein the plurality of indicators characterizing a likelihood of the document containing such attribute not being privileged is selected from a group consisting of: language from a website page, language from a press release, and language from a product brochure; and
   determining, by at least one data processor, which of the documents are potentially privileged based on the first comparison and the second comparison, the determination being applied to the entire grouping; and
   providing, by at least one data processor, data identifying which of the documents are potentially privileged.

19. A computer program product as in claim 18, wherein the plurality of indicators characterizing a likelihood of the document containing such attribute not being privileged comprise privacy terms.

20. A system comprising:
   at least one data processor;
   memory storing instructions, which when executed by at least one data processor, result in operations comprising:
      importing a set of documents;
      grouping at least a portion of the set of documents based on common characteristics among the documents;
      first comparing attributes of a subset of each grouping of the documents with a plurality of pre-defined indicators, the indicators characterizing a likelihood of the document containing such attributes being privileged and not subject to disclosure as part of an ongoing litigation matter;
      second comparing attributes of a subset of each grouping of documents with a plurality of indicators characterizing a likelihood of the document containing such attribute not being privileged, wherein the plurality of indicators characterizing a likelihood of the document containing such attribute not being privileged is selected from a group consisting of: language from a website page, language from a press release, and language from a product brochure; and
      determining which of the documents are potentially privileged based on the first comparison and the second comparison, the determination being applied to the entire grouping; and
      providing data identifying which of the documents are potentially privileged.

21. A system as in claim 20, wherein the plurality of indicators characterizing a likelihood of the document containing such attribute not being privileged comprise privacy terms.

22. A method for implementation by one or more data processors forming part of at least one computing system, the method comprising:
   receiving a service request from a remote computing system;
   importing, by at least one data processor, a set of documents associated with a first litigation matter in response to the service request;
   comparing, by at least one data processor, attributes of each of the documents with a plurality of pre-defined indicators, the indicators comprising a first set of text strings generated from a plurality of litigation matters other than the first litigation matter and user-defined text strings characterizing a likelihood of the document containing such attribute being privileged and a second set of text strings generated from a plurality of litigation matters other than the first litigation matter and user-defined text strings characterizing a likelihood of the document containing such attribute not being privileged;
   determining, by at least one data processor, which of the documents are potentially privileged based on the comparison; and
   providing, by at least one data processor, data to the remote computing system identifying which of the documents are potentially privileged, wherein the providing does not any of the underlying data from the plurality litigation matters other than the first litigation matter.

* * * * *